United States Patent
Bickham et al.

(10) Patent No.: US 8,218,929 B2
(45) Date of Patent: Jul. 10, 2012

(54) LARGE EFFECTIVE AREA LOW ATTENUATION OPTICAL FIBER

(75) Inventors: Scott Robertson Bickham, Corning, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 206 days.

(21) Appl. No.: 12/691,174

(22) Filed: Jan. 21, 2010

(65) Prior Publication Data
US 2010/0215329 A1 Aug. 26, 2010

Related U.S. Application Data

(60) Provisional application No. 61/155,741, filed on Feb. 26, 2009.

(51) Int. Cl.
*G02B 6/02* (2006.01)
(52) U.S. Cl. .................................. 385/127; 385/123
(58) Field of Classification Search .................. 385/123, 385/126, 127
See application file for complete search history.

(56) References Cited

U.S. PATENT DOCUMENTS

| 6,301,422 B1 | 10/2001 | Li ................................. 385/127 |
| 6,904,218 B2 * | 6/2005 | Sun et al. ....................... 385/127 |
| 2008/0279517 A1 | 11/2008 | Bickham et al. ............... 385/124 |

FOREIGN PATENT DOCUMENTS

| EP | 0260795 | 7/1987 |
| EP | 1 978 383 | 10/2008 |
| WO | 2008/106033 | 9/2008 |

OTHER PUBLICATIONS

"Optical transmission fiber design evolution"; Li, et al; Journal of Lightwave Technology; vol. 26; No. 9, May 1, 2008; p. 1079-1092.
"Ultra-low bending loss single-mode fiber for FTTH"; Li et al; Journal of Lightwave Technology; vol. 27, No. 3, Feb. 1, 2009; p. 376-382.

* cited by examiner

*Primary Examiner* — Sarah Hahm
(74) *Attorney, Agent, or Firm* — Matthew J. Mason

(57) ABSTRACT

Optical waveguide fiber that has large effective area and low loss characteristics, such as low attenuation and low bend loss. The optical waveguide fiber includes a dual trench design wherein an annular region closer to the core is preferably doped with at least one downdopant such as fluorine, which annular region is surrounded by another annular region that preferably includes closed, randomly dispersed voids.

19 Claims, 4 Drawing Sheets

LARGE EFFECTIVE AREA LOW ATTENUATION OPTICAL FIBER

CROSS-REFERENCE TO RELATED APPLICATIONS

This application claims the benefit of, and priority to U.S. Provisional Patent Application No. 61/155,741 filed on Feb. 26, 2009 entitled, "Large Effective Area Low Attenuation Optical Fiber", the content of which is relied upon and incorporated herein by reference in its entirety.

BACKGROUND OF THE INVENTION

1. Field of the Invention

The present invention relates generally to optical fiber, and particularly to optical fibers that have large effective area and low bend loss at 1550 nm.

2. Technical Background

Optical amplifier technology and wavelength division multiplexing techniques are typically required in telecommunication systems that provide high power transmissions for long distances. The definition of high power and long distances is meaningful only in the context of a particular telecommunication system wherein a bit rate, a bit error rate, a multiplexing scheme, and perhaps optical amplifiers are specified. There are additional factors, known to those skilled in the art, which have impacted upon the definition of high power and long distance. However, for most purposes, high power is an optical power greater than about 10 mW. In some applications, single power levels of 1 mW or less are still sensitive to non-linear effects, so that the effective area is still an important consideration in such lower power systems.

Generally, an optical waveguide fiber having a large effective area ($A_{eff}$) reduces non-linear optical effects, including self-phase modulation, four-wave-mixing, cross-phase modulation, and non-linear scattering processes, all of which can cause degradation of signals in high powered systems.

On the other hand, an increase in effective area of an optical waveguide fiber typically results in an increase in macrobending induced losses which attenuate signal transmission through a fiber. The macrobending losses become increasingly significant over long (e.g., 100 km, or more) distances (or spacing between regenerators, amplifiers, transmitters and/or receivers). Unfortunately, the larger the effective area of a conventional optical fiber is, the higher the macrobend induced losses because the core does not provide sufficient confinement of the optical power.

SUMMARY OF THE INVENTION

One aspect of the invention is an optical fiber that includes a glass core extending from a centerline to a radius $R_1$, wherein $R_1$ is greater than about 5 µm, and a glass cladding surrounding and in contact with the core. The cladding includes a first annular region extending from the radius $R_1$ to a radius $R_2$, the first annular region having a radial width $W_1=R_2-R_1$. The cladding also includes a second annular region extending from the radius $R_2$ to a radius $R_3$, the second annular region having a radial width $W_2=R_3-R_2$. In addition, the cladding includes a third annular region extending from the radius $R_3$ to a radius $R_4$, the third annular region having a radial width $W_3=R_4-R_3$. The cladding further includes a fourth annular region extending from the radius $R_4$ to an outermost glass radius $R_5$. The core has a maximum relative refractive index, $\Delta_{0MAX}$. The second annular region has a minimum relative refractive index, $\Delta_{2MIN}$. The third annular region has a minimum relative refractive index, $\Delta_{3MIN}$. In addition, $\Delta_{0MAX}>0>\Delta_{2MIN}>\Delta_{3MIN}$. Moreover, the core and the cladding provide a fiber with cable cutoff less than 1500 nm and an effective area at 1550 nm of greater than 130 µm².

In another aspect, the present invention includes an optical fiber that includes a glass core extending from a centerline to a radius $R_1$, wherein $R_1$ is greater than about 5 µm, and a glass cladding surrounding and in contact with the core. The cladding includes a first annular region extending from the radius $R_1$ to a radius $R_2$, the first annular region having a radial width $W_1=R_2-R_1$. The cladding also includes a second annular region extending from the radius $R_2$ to a radius $R_3$, the second annular region having a radial width $W_2=R_3-R_2$. In addition, the cladding includes a third annular region extending from the radius $R_3$ to an outermost glass radius $R_4$. The core has a maximum relative refractive index, $\Delta_{0MAX}$. The first annular region has a minimum relative refractive index, $\Delta_{1MIN}$. The second annular region has a minimum relative refractive index, $\Delta_{2MIN}$. In addition, $\Delta_{0MAX}>0>\Delta_{1MIN}>\Delta_{2MIN}$. Moreover, the core and the cladding provide a fiber with cable cutoff less than 1500 nm, an attenuation at 1550 nm of less than 0.20 dB/km, and an effective area at 1550 nm of greater than 130 µm².

In yet another aspect, the present invention includes an optical fiber that includes a glass core extending from a centerline to a radius $R_1$, wherein $R_1$ is greater than about 5 µm, and a glass cladding surrounding and in contact with the core. The core and the cladding provide a fiber with cable cutoff less than 1500 nm, an attenuation at 1550 nm of less than 0.20 dB/km, and an effective area at 1550 nm of greater than 150 µm².

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
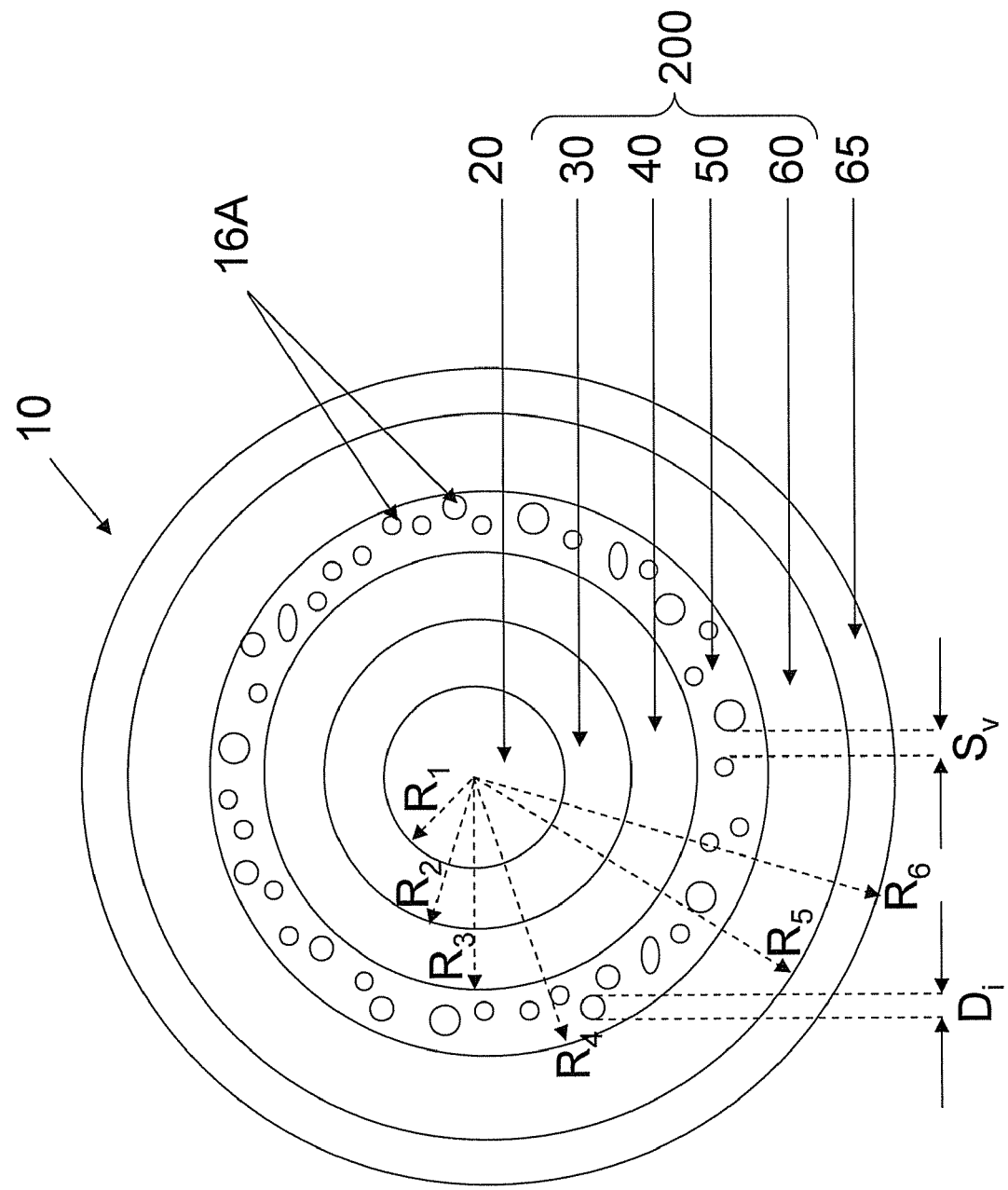
FIG. 1 is a schematic cross-sectional view of an embodiment of an optical waveguide fiber as disclosed herein.

Reference will now be made in detail to the present preferred embodiments of the invention, examples of which are illustrated in the accompanying drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the outermost region of the cladding. As used herein, the relative refractive index is represented by $\Delta$ and its values are given in units of "%", unless otherwise specified.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

"Effective area" is defined as:

$$A_{eff} = 2\pi (\int f^2 r\, dr)^2 / (\int f^4 r\, dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" or "alpha profile" refers to a relative refractive index profile, expressed in terms of Δ(r) which is in units of "%", where r is radius, which follows the equation, $$\Delta(r) = \Delta(r_o)(1 - [|r - r_o|/(r_1 - r_o)]^\alpha),$$

where $r_o$ is the point at which Δ(r) is maximum, $r_1$ is the point at which Δ(r) % is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2 = (2\int f^2 r\, dr/\int [df/dr]^2 r\, dr)$, the integral limits being 0 to ∞.

The bend resistance of a waveguide fiber can be gauged by induced attenuation under prescribed test conditions, for example by deploying or wrapping the fiber around a mandrel of a prescribed diameter.

The cabled cutoff wavelength, or "cabled cutoff" is approximated by the test described in the EIA-445 Fiber Optic Test Procedures, which are part of the EIA-TIA Fiber Optics Standards, that is, the Electronics Industry Alliance-Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170". By cable cutoff as used herein, we mean the value obtained using the approximated test.

"Kappa" or κ is total dispersion divided by total dispersion slope, both at 1550 nm.

Unless otherwise noted herein, optical properties (such as dispersion, dispersion slope, etc.) are reported for the LP01 mode. Unless otherwise noted herein, a wavelength of 1550 nm is the reference wavelength.

Figure 2:
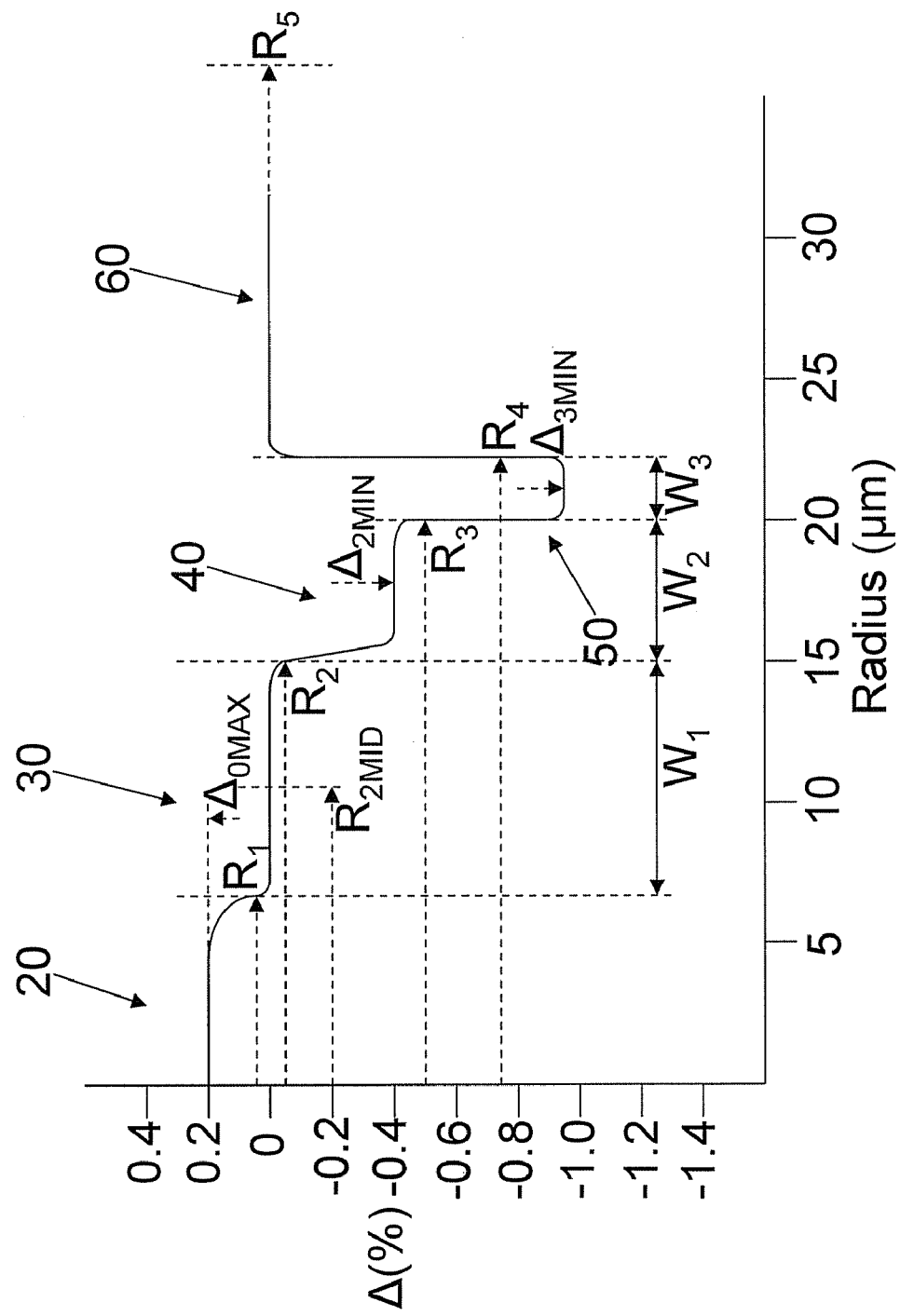
FIG. 2 shows a relative refractive index profile of an embodiment of an optical waveguide fiber as disclosed herein.

Referring to FIGS. 1-2, in a set of preferred embodiments, optical fiber 10 disclosed herein comprises a core 20 and a cladding layer (or cladding) 200 surrounding and directly adjacent to the core. The core 20 has a refractive index profile $\Delta_{CORE}(r)$. The cladding 200 has a refractive index profile $\Delta_{CLAD}(r)$.

In some embodiments, the core comprises silica doped with germanium, i.e., germania doped silica. Dopants other than germanium, singly or in combination, may be employed within the core, and particularly at or near the centerline of the optical fiber disclosed herein to obtain the desired refractive index and density. In some embodiments, the optical fiber 10 contains no index-decreasing dopants in the core 20.

Referring to FIGS. 1-2, optical waveguide fibers are disclosed herein that include a core 20 extending radially outwardly from the centerline to a radius $R_1$ and having a relative refractive index profile $\Delta_0(r)$ in %, with a maximum relative refractive index percent, $\Delta_{0MAX}$, and a cladding 200 surrounding and directly adjacent, i.e., in direct contact with, the core 20. Cladding 200 includes a first annular region 30 extending from the radius $R_1$ to a radius $R_2$, the first annular region having a radial width $W_1 = R_2 - R_1$, a midpoint $R_{2MID} = (R_2 + R_1)/2$, and a relative refractive index profile $\Delta_1(r)$ in %, with a midpoint relative refractive index percent, $\Delta_{1MID}$, at $R_{2MID}$, maximum relative refractive index percent, $\Delta_{1MAX}$, and a minimum relative refractive index percent $\Delta_{1MIN}$. Cladding 200 also includes a second annular region 40 extending from the radius $R_2$ to a radius $R_3$, the second annular region having a radial width $W_2 = R_3 - R_2$ and a relative refractive index profile $\Delta_2(r)$ in %, with a minimum relative refractive index percent $\Delta_{2MIN}$. Cladding 200 additionally includes a third annular region 50 extending from the radius $R_3$ to a radius $R_4$, the third annular region having a radial width $W_3 = R_4 - R_3$, and a relative refractive index profile $\Delta_3(r)$ in %, with a minimum relative refractive index percent $\Delta_{3MIN}$. Cladding 200 further includes a fourth annular region 60 extending from the radius $R_4$ to the outermost glass radius $R_5$, having a relative refractive index profile $\Delta_4(r)$ in %. Fourth annular region 60 can be optionally surrounded by one or more polymer coatings 65. $R_1$ is defined to occur at the radius where $\Delta_0(r)$ first reaches 0.03% going radially outward from the centerline. That is, core 20 ends and the first annular region 30 begins where the relative refractive index first reaches 0.03% (going radially outward) at a radius $R_1$. $R_2$ is defined to occur at the radius where $\Delta_1(r)$ first reaches −0.05% going radially outward from $R_1$. That is, first annular region 30 ends and second annular region 40 begins where the relative refractive index first reaches −0.05% (going radially outward) at a radius $R_2$. $R_3$ is defined to occur at the radius where $\Delta_2(r)$ first reaches −0.5% going radially outward from $R_2$. That is, second annular region 40 ends and third annular region 50 begins where the relative refractive index first reaches −0.5% (going radially outward) at a radius $R_3$. $R_4$ is defined to occur at the radius where $\Delta_4(r)$ first reaches −0.05% going radially inward from $R_5$. That is, fourth annular region 60 ends and third annular region 50 begins where the relative refractive index first reaches −0.05% (going radially inward) at a radius $R_4$. $R_1$ is greater than about 5 μm. Also, $\Delta_{0MAX} > 0 > \Delta_{2MIN} > \Delta_{3MIN}$. In addition, $\Delta_{0MAX} > \Delta_{1MAX} > \Delta_{1MID} > \Delta_{1MIN} > \Delta_{2MIN} > \Delta_{3MIN}$.

The second annular region 40 has a profile volume, $V_2$, defined herein as:

$$2 \int_{R_2}^{R_3} \Delta(r) r\, dr;$$

In preferred embodiments, $\Delta_{0MAX} < 0.3\%$, such as $0.3\% > \Delta_{0MAX} > 0.1\%$ and $0.25\% > \Delta_{0MAX} > 0.1\%$, $\Delta_{2MIN} < -0.1\%$, such as $-0.1\% > \Delta_{2MIN} > -0.5\%$, and $\Delta_{3MIN} < -0.5\%$, such as $-0.7\% > \Delta_{3MIN} > -3\%$ and $-0.7\% > \Delta_{3MIN} > -2\%$. Preferably, $\Delta_{1MAX}$ is not greater than 0.03%, $\Delta_{1MIN}$ is not less than −0.03%, and $0.025\% > \Delta_{1MID} > -0.025\%$. Preferably, $R_1 > 6$ μm, such as 6 μm < $R_1$ < 9 μm, $R_2 > 10$ μm, such as 10 μm < $R_2$ < 15 μm, $R_3 > 16$ μm, such as 16 μm < $R_3$ < 24 μm, and $R_4 > 20$ μm, such as 20 μm < $R_4$ < 30 μm. Preferably, $W_1 > 2$ μm, such as 2 μm < $W_1$ < 10 μm, $W_2 > 3$ μm, such as 3 μm < $W_2$ < 15

μm, and $W_3>1.5$ μm, such as 1.5 μm<$W_3$<4.5 μm. Preferably, $|V_2|$ is at least 30%-μm², such as 30%-μm²<$|V_2|$<90%-μm² and further such as 40%-μm²<$|V_2|$<80%-μm².

In preferred embodiments, $\Delta_{2MIN}$<−0.25%, such as −0.3%>$\Delta_{2MIN}$>−0.5%, and $W_1$>5 μm, such as 6 μm<$W_1$<10 μm. Preferably, $\Delta_{0MAX}$<0.3%, such as 0.3%>$\Delta_{0MAX}$>0.1%, and $\Delta_{3MIN}$<−0.7%, such as −0.7%>$\Delta_{3MIN}$>−3% and −0.7%>$\Delta_{3MIN}$>−2%. Preferably, $\Delta_{1MAX}$ is not greater than 0.05%, $\Delta_{1MIN}$ is not less than −0.05%, and 0.025%>$\Delta_{1MID}$>−0.025%. Preferably, $R_1$>6 μm, such as 6 μm<$R_1$<9 μm, $R_2$>12 μm, such as 12 μm<$R_2$<15 μm, $R_3$>16 μm, such as 16 μm<$R_3$<24 μm, and $R_4$>20 μm, such as 20 μm<$R_4$<30 μm. Preferably, $W_2$>3 μm, such as 3 μm<$W_2$<9 μm, and $W_3$>1.5 μm, such as 1.5 μm<$W_3$<4.5 μm. Preferably, $|V_2|$ is at least 30%-μm², such as 30%-μm²<$|V_2|$<90%-μm² and further such as 40%-μm²<$|V_2|$<80%-μm².

In preferred embodiments, $\Delta_{2MIN}$>−0.25%, such as −0.1%>$\Delta_{2MIN}$>−0.25%, $W_1$<5 μm, such as 2 μm<$W_1$<4 μm, and $W_2$>5 μm, such as 6 μm<$W_2$<15 μm. Preferably, $\Delta_{0MAX}$<0.3%, such as 0.3%>$\Delta_{0MAX}$>0.1%, and $\Delta_{3MIN}$<−0.7%, such as −0.7%>$\Delta_{3MIN}$>−3%. Preferably, $\Delta_{1MAX}$ is not greater than 0.03%, $\Delta_{1MIN}$ is not less than −0.03%, and 0.025%>$\Delta_{1MID}$>−0.025%. Preferably, $R_1$>6 μm, such as 6 μm<$R_1$<9 μm, $R_2$>10 μm, such as 10 μm<$R_2$<13 μm, $R_3$>16 μm, such as 16 μm<$R_3$<24 μm, and $R_4$>20 μm, such as 20 μm<$R_4$<30 μm. Preferably, $W_3$>1.5 μm, such as 1.5 μm<$W_3$<4.5 μm. Preferably, $|V_2|$ is at least 30%-μm², such as 30%-μm²<$|V_2|$90%-μm² and further such as 40%μm²<$|V_2|$<80%-μm².

In preferred embodiments, second annular region 40 comprises silica glass having at least one dopant selected from the group consisting of germanium, aluminum, phosphorous, titanium, boron, and fluorine. In more preferred embodiments, second annular region 40 consists essentially of silica glass having at least one dopant selected from the group consisting of boron and fluorine. In even more preferred embodiments, second annular region 40 consists essentially of silica glass doped with fluorine. Preferably, second annular region 40 contains no voids (i.e., is void-free).

Referring specifically to FIG. 1, the third annular region 50 preferably comprises silica based glass (either pure, undoped silica or silica doped with for example, at least one of germanium, aluminum, phosphorous, titanium, boron, and fluorine) containing a plurality of closed randomly dispersed voids 16A, the voids 16A being either empty (vacuum) or containing a gas (e.g., argon, air, nitrogen, krypton, or $SO_2$) filled. Such voids can provide an effective refractive index which is low, e.g., compared to pure silica. The relative percent index of refraction ($\Delta n$ %) in third annular region 50 fluctuates between −28% (index of void filled gas relative to that of silica) and that of the glass surrounding the voids (in this example it is silica, with the relative % index of refraction $\Delta_4(r)$ of about 0%). A typical average relative refractive index percent $\Delta_{3avg}$ of the third annular region 50 will be between −1% and −3%, relative to pure silica glass, depending on the dopants present in the glass surrounding the voids. That is, the index of third annular region 50 fluctuates, and in the example of FIG. 1 the width of the gas filled voids, and/or the glass filled spacing $S_v$ between the gas filled voids is randomly distributed and/or are not equal to one another. That is, the voids are non-periodic. It is preferable that the mean distance between the voids is less than 5000 nm, more preferably less than 2000 nm, even more preferably less than 1000 nm, for example less than 750 nm, 500 nm, 400 nm, 300 nm, 200 nm or 100 nm. Preferably, at least 80%, and more preferably at least 90% of the voids have a maximum cross-sectional dimension Di of less than 1000 nm, preferably less than 500 nm. Even more preferably, the mean diameter of the voids is less than 500 nm, more preferably less than 300 nm, and even more preferably less than 200 nm. The voids 16A are closed (surrounded by solid material) and are non-periodic. That is, the voids 16A may have the same size, or may be of different sizes. The distances between voids may be uniform (i.e., the same), or may be different. Preferably the third annular region 50 when viewed in cross section exhibits at least 50 voids, more preferably at least 100 voids, even more preferably at least 200 voids and most preferably at least 250 voids.

In some embodiments, a central segment of the core 20 may comprise a relative refractive index profile having a so-called centerline dip which may occur as a result of one or more optical fiber manufacturing techniques. For example, the central segment may have a local minimum in the refractive index profile at radii less than 1 μm, wherein higher values for the relative refractive index (including the maximum relative refractive index for the core segment) occur at radii greater than r=0 μm.

Figure 3:
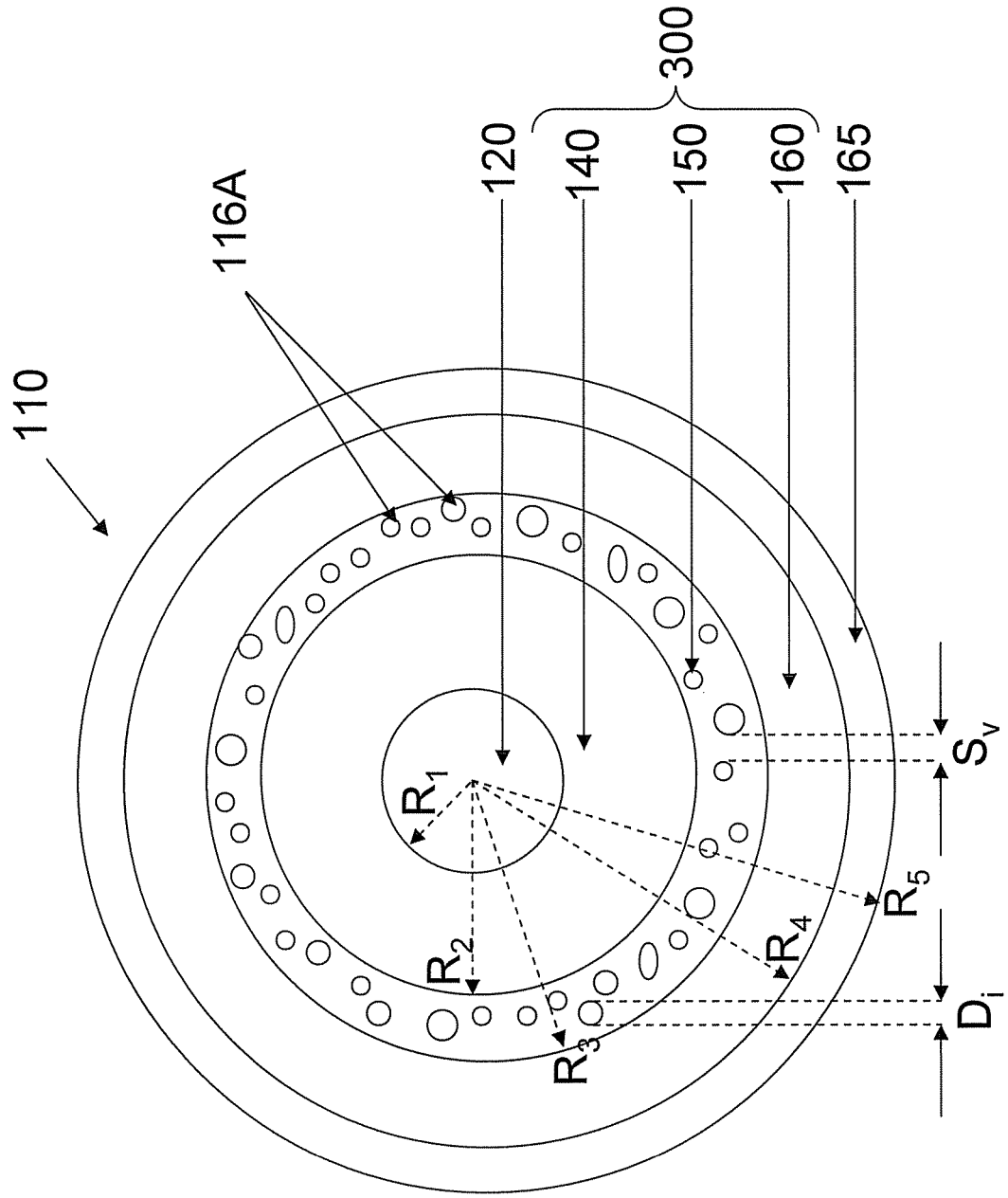
FIG. 3 is a schematic cross-sectional view of another embodiment of an optical waveguide fiber as disclosed herein.
Figure 4:
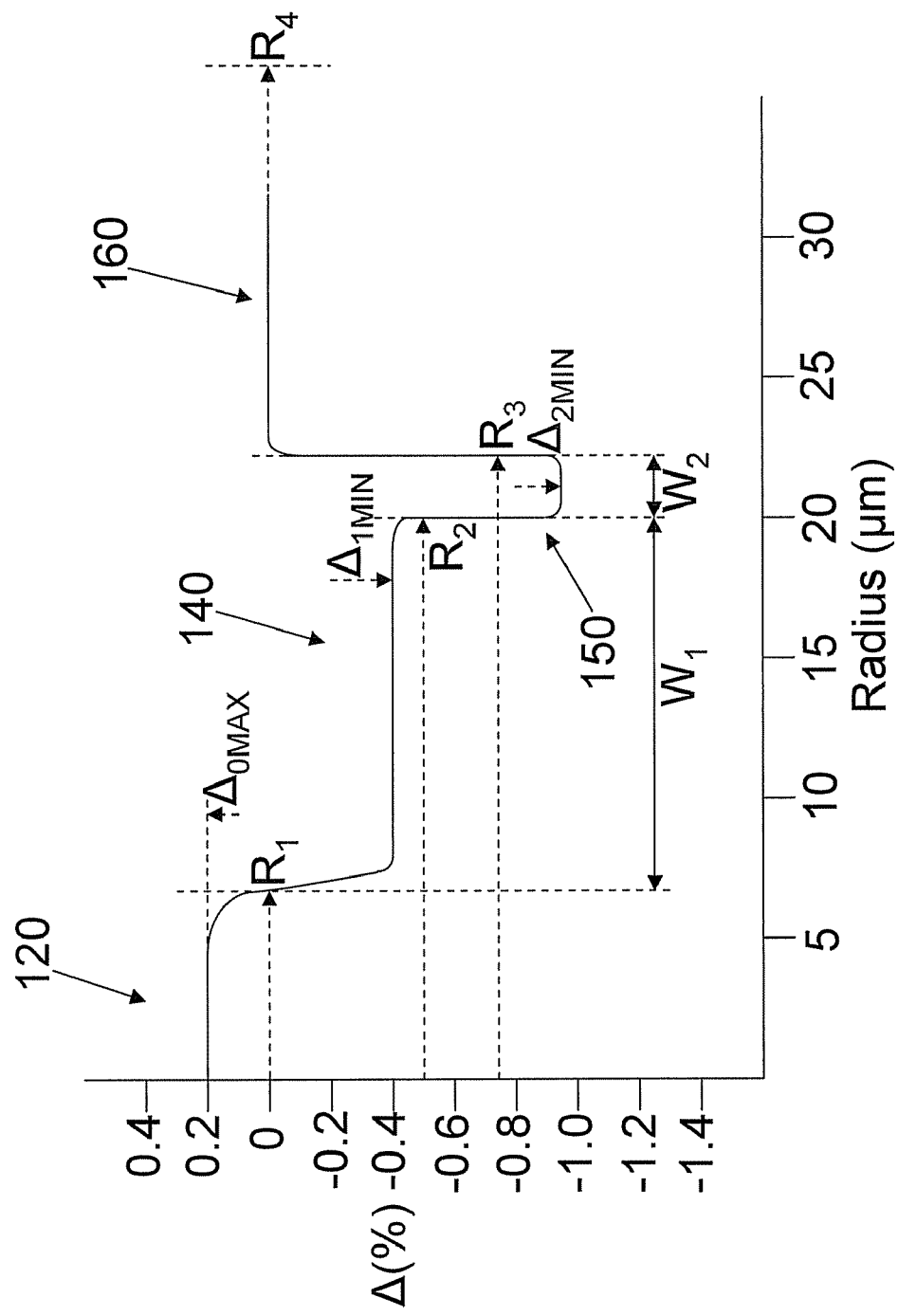
FIG. 4 shows a relative refractive index profile of another embodiment of an optical waveguide fiber as disclosed herein.

Referring to FIGS. 3-4, optical waveguide fibers 110 are disclosed herein that include a core 120 extending radially outwardly from the centerline to a radius $R_1$ and having a relative refractive index profile $\Delta_0(r)$ in %, with a maximum relative refractive index percent, $\Delta_{0MAX}$, and a cladding 300 surrounding and directly adjacent, i.e., in direct contact with, the core 120. Cladding 300 includes a first annular region 140 extending from the radius $R_1$ to a radius $R_2$, the first annular region having a radial width $W_1=R_2-R_1$ and a relative refractive index profile $\Delta_1(r)$ in %, with a minimum relative refractive index percent $\Delta_{1MIN}$. Cladding 300 also includes a second annular region 150 extending from the radius $R_2$ to a radius $R_3$, the second annular region having a radial width $W_2=R_3-R_2$, and a relative refractive index profile $\Delta_2(r)$ in %, with a minimum relative refractive index percent $\Delta_{2MIN}$. Cladding 300 additionally includes a third annular region 160 extending from the radius $R_3$ to the outermost glass radius $R_4$, having a relative refractive index profile $\Delta_3(r)$ in %. Third annular region 160 can be optionally surrounded by one or more polymer coatings 165. $R_1$ is defined to occur at the radius where $\Delta_0(r)$ first reaches 0% going radially outward from the centerline. That is, core 120 ends and the first annular region 140 begins where the relative refractive index first reaches 0% (going radially outward) at a radius $R_1$. $R_2$ is defined to occur at the radius where $\Delta_1(r)$ first reaches −0.5% going radially outward from $R_1$. That is, first annular region 140 ends and second annular region 150 begins where the relative refractive index first reaches −0.5% (going radially outward) at a radius $R_2$. $R_3$ is defined to occur at the radius where $\Delta_3(r)$ first reaches −0.05% going radially inward from $R_4$. That is, third annular region 160 ends and second annular region 150 begins where the relative refractive index first reaches −0.05% (going radially inward) at a radius $R_3$. $R_1$ is greater than about 5 μm. Also, $\Delta_{0MAX}$>0>$\Delta_{1MIN}$>$\Delta_{2MIN}$.

The first annular region 140 has a profile volume, $V_1$, defined herein as:

$$2\int_{R_1}^{R_2} \Delta(r)r\,dr;$$

In preferred embodiments, $\Delta_{0MAX}$<0.3%, such as 0.3%>$\Delta_{0MAX}$>0.1% and 0.25%>$\Delta_{0MAX}$>0.1%, $\Delta_{1MIN}$<−0.1%, such as −0.1%>$\Delta_{1MIN}$>−0.5%, and $\Delta_{2MIN}$<−0.7%, such as −0.7%>$\Delta_{2MIN}$>−3% and 0.7%>$\Delta_{2MIN}$>−2%. Preferably, $R_1$>6 μm, such as 6 μm<$R_1$<9 μm, $R_2$>16 μm, such as 16 μm<$R_2$<24 μm, and $R_3$>20 μm, such as 20 μm<$R_3$<30 μm.

Preferably, $W_1>3$ μm, such as 3 μm$<W_1<$15 μm, and $W_2>$1.5 μm, such as 1.5 μm$<W_2<$4.5 μm. Preferably, $|V_1|$ is at least 30%-μm², such as 30%-μm²$<|V_1|<$90%-μm² and further such as 40%-μm²$<|V_1|<$80%-μm².

In preferred embodiments, first annular region 140 comprises silica glass having at least one dopant selected from the group consisting of germanium, aluminum, phosphorous, titanium, boron, and fluorine. In more preferred embodiments, first annular region 140 consists essentially of silica glass having at least one dopant selected from the group consisting of boron and fluorine. In even more preferred embodiments, first annular region 140 consists essentially of silica glass doped with fluorine. Preferably, first annular region 140 contains no voids (i.e., is void-free).

Referring specifically to FIG. 3, the second annular region 150 preferably comprises silica based glass (either pure, undoped silica or silica doped with for example, at least one of germanium, aluminum, phosphorous, titanium, boron, and fluorine) containing a plurality of closed randomly dispersed voids 116A, the voids 116A being either empty (vacuum) or containing a gas (e.g., argon, air, nitrogen, krypton, or $SO_2$) filled. Such voids can provide an effective refractive index which is low, e.g., compared to pure silica. The relative percent index of refraction (Δn %) in second annular region 150 fluctuates between −28% (index of void filled gas relative to that of silica) and that of the glass surrounding the voids (in this example it is silica, with the relative % index of refraction $\Delta_4(r)$ of about 0%). A typical average relative refractive index percent $\Delta_{3avg}$ of the second annular region 150 will be between −1% and −3%, relative to pure silica glass, depending on the dopants present in the glass surrounding the voids. That is, the index second annular region 150 fluctuates, and in the example of FIG. 3 the width of the gas filled voids, and/or the glass filled spacing $S_v$ between the gas filled voids is randomly distributed and/or are not equal to one another. That is, the voids are non-periodic. It is preferable that the mean distance between the voids is less than 5000 nm, more preferably less than 2000 nm, even more preferably less than 1000 nm, for example less than 750 nm, 500 nm, 400 nm, 300 nm, 200 nm or 100 nm. Preferably, at least 80%, and more preferably at least 90% of the voids have a maximum cross-sectional dimension Di of less than 1000 nm, preferably less than 500 nm. Even more preferably, the mean diameter of the voids is less than 500 nm, more preferably less than 300 nm, and even more preferably less than 200 nm. The voids 116A are closed (surrounded by solid material) and are non-periodic. That is, the voids 116A may have the same size, or may be of different sizes. The distances between voids may be uniform (i.e., the same), or may be different. Preferably the second annular region 150 when viewed in cross section exhibits at least 50 voids, more preferably at least 100 voids, even more preferably at least 200 voids and most preferably at least 250 voids.

In some embodiments, a central segment of the core 120 may comprise a relative refractive index profile having a so-called centerline dip which may occur as a result of one or more optical fiber manufacturing techniques. For example, the central segment may have a local minimum in the refractive index profile at radii less than 1 μm, wherein higher values for the relative refractive index (including the maximum relative refractive index for the core segment) occur at radii greater than r=0 μm.

The embodiments disclosed herein provide a dual trench design, wherein an annular region closer to the core is preferably doped with at least one downdopant such as fluorine, which annular region is surrounded by another annular region that preferably includes closed, randomly dispersed voids. This dual trench design has been found to provide for an optical fiber having a combination of large effective area and low loss characteristics. In particular, this dual trench design has been found to provide an optical fiber with a cable cutoff of less than 1500 nm and an effective area at 1550 nm of greater than 130 μm², such as an effective area of 130 μm² to 200 μm², wherein the fiber also has low attenuation and low microbend loss.

Preferably, optical fiber disclosed herein provide a cable cutoff of less than 1450 nm, including a cable cutoff of less than 1400 nm. Preferably, optical fiber disclosed herein provide an effective area at 1550 nm of greater than 140 μm², such as an effective area of 140 μm² to 190 μm². More preferably, optical fiber disclosed herein provide an effective area at 1550 nm of greater than 150 μm², such as an effective area of 150 μm² to 180 μm². Preferably, optical fiber disclosed herein provide an attenuation at 1550 nm of less than 0.21 dB/km, even more preferably less than 0.20 dB/km, and yet even more preferably less than 0.19 dB/km. Preferably, optical fiber disclosed herein provide a bend loss at 1550 nm of less than 1.5 dB/turn around a 20 mm diameter mandrel, even more preferably a bend loss at 1550 nm of less than 1.0 dB/turn around a 20 mm diameter mandrel, and yet even more preferably a bend loss at 1550 nm of less than 0.5 dB/turn around a 20 mm diameter mandrel.

EXAMPLES

Examples 1-5 set forth refractive index profile parameters and optical properties of modeled optical fibers in accordance with embodiments disclosed herein and illustrated, for example, in FIGS. 1-2. Table 1 lists refractive index profile parameters of Examples 1-5 and Table 2 lists modeled optical properties of Examples 1-5.

TABLE 1

Refractive Index Profile Parameters

| Example | 1 | 2 | 3 | 4 | 5 |
|---|---|---|---|---|---|
| $\Delta_{0MAX}$ (%) | 0.2 | 0.198 | 0.198 | 0.196 | 0.16 |
| $R_1$ (μm) | 7.17 | 7.17 | 7.3 | 7.3 | 8.15 |
| $\Delta_{1MID}$ (%) | 0 | 0 | 0 | 0 | 0 |
| $R_2$ (μm) | 14.5 | 12.4 | 11.45 | 11.1 | 12.1 |
| $W_1$ (μm) | 7.33 | 5.23 | 4.15 | 3.8 | 3.95 |
| $\Delta_{2MIN}$ (%) | −0.4 | −0.3 | −0.25 | −0.18 | −0.18 |
| $R_3$ (μm) | 19.5 | 19.5 | 19.5 | 21 | 22 |
| $W_2$ (μm) | 5 | 7.1 | 8.05 | 9.9 | 9.9 |
| $\Delta_{3MIN}$ (%) | −1 | −1 | −1 | −1 | −1.3 |
| $R_4$ (μm) | 22 | 22 | 22 | 23 | 24 |
| $W_3$ (μm) | 2.5 | 2.5 | 2.5 | 2 | 2 |
| core alpha | 8 | 8 | 8 | 8 | 8 |
| $|V_2|$ (%-μm²) | 68 | 67.9 | 62.3 | 57.2 | 60.8 |

TABLE 2

Modeled Optical Properties

| Example | 1 | 2 | 3 | 4 | 5 |
|---|---|---|---|---|---|
| MFD at 1550 nm (μm) | 13.94 | 13.74 | 13.67 | 13.72 | 15.11 |

TABLE 2-continued

Modeled Optical Properties

| Example | 1 | 2 | 3 | 4 | 5 |
|---|---|---|---|---|---|
| Aeff at 1550 nm ($\mu m^2$) | 153.0 | 150.1 | 150.0 | 150.9 | 184.2 |
| Dispersion at 1550 nm (ps/nm/km) | 20.92 | 21.39 | 21.68 | 21.56 | 21.83 |
| Dispersion Slope at 1550 nm (ps/nm$^2$/km) | 0.0643 | 0.0647 | 0.0647 | 0.0643 | 0.0646 |
| Kappa at 1550 nm (nm) | 325.3 | 330.4 | 335.3 | 335.4 | 337.9 |
| LP11 Cutoff (nm) | 1423 | 1391 | 1398 | 1392 | 1393 |
| Attenuation at 1550 nm (dB/km) | 0.1846 | 0.1845 | 0.1845 | 0.1844 | 0.1831 |

Each of the modeled optical fibers of Examples 1-5 is expected to exhibit a bend loss at 1550 nm of less than 1.0 dB/turn around a 20 mm diameter mandrel.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
a glass core extending from a centerline to a radius $R_1$, wherein $R_1$ is greater than about 5 µm; a glass cladding surrounding and in contact with the core;
wherein the cladding comprises:
a first annular region extending from the radius $R_1$ to a radius $R_2$, the first annular region comprising a radial width $W_1=R_2-R_1$;
a second annular region extending from the radius $R_2$ to a radius $R_3$, the second annular region comprising a radial width $W_2=R_3-R_2$;
a third annular region extending from the radius $R_3$ to a radius $R_4$, the third annular region comprising a radial width $W_3=R_4-R_3$; and
a fourth annular region extending from the radius $R_4$ to an outermost glass radius $R_5$;
wherein the core comprises a maximum relative refractive index, $\Delta_{0MAX}$, the second annular region comprises a minimum relative refractive index, $\Delta_{2MIN}$, and the third annular region comprises a minimum relative refractive index, $\Delta_{3MIN}$, wherein $\Delta_{0MAX}>0>\Delta_{2MIN}>\Delta_{3MIN}$; and
wherein the core and the cladding provide a fiber with cable cutoff less than 1500 nm and an effective area at 1550 nm of greater than 130 µm$^2$.

2. The optical fiber of claim 1, wherein $0.3\%>\Delta_{0MAX}>0.1\%$, $-0.1\%>\Delta_{2MIN}>-0.5\%$, and $\Delta_{3MIN}<-0.7\%$.

3. The optical fiber of claim 1, wherein 6 µm<$R_1$<9 µm, 10 µm<$R_2$<15 µm, 16 µm<$R_3$<24 µm, and 20 µm<$R_4$<30 µm.

4. The optical fiber of claim 1, wherein 2 µm<$W_1$<10 µm, 3 µm<$W_2$<15 µm, and 1.5 µm<$W_3$<4.5 µm.

5. The optical fiber of claim 1, wherein the second annular region comprises fluorine and is void-free.

6. The optical fiber of claim 1, wherein the third annular region comprises silica based glass with at least 50 closed randomly dispersed voids situated therein, and (i) the mean distance between the voids is less than 5000 nm, and (ii) at least 80% of the voids have a maximum cross-sectional dimension Di of less than 1000 nm.

7. The optical fiber of claim 1, wherein the second annular region comprises a profile volume $V_2$, equal to:

$$2\int_{R_2}^{R_3} \Delta(r)r\,dr;$$

wherein $|V_2|$ is at least 30%-µm$^2$.

8. The optical fiber of claim 1, wherein the core and the cladding provide a fiber having an attenuation at 1550 nm of less than 0.19 dB/km.

9. The optical fiber of claim 1, wherein the core and the cladding provide a fiber with an effective area at 1550 nm of greater than 150 µm$^2$.

10. The optical fiber of claim 1, wherein the core and the cladding provide a fiber with a bend loss at 1550 nm of less than 1.0 dB/turn on a 20 mm diameter mandrel.

11. An optical fiber comprising:
a glass core extending from a centerline to a radius $R_1$, wherein $R_1$ is greater than about 5 µm; a glass cladding surrounding and in contact with the core;
wherein the cladding comprises:
a first annular region extending from the radius $R_1$ to a radius $R_2$, the first annular region comprising a radial width $W_1=R_2-R_1$;
a second annular region extending from the radius $R_2$ to a radius $R_3$, the second annular region comprising a radial width $W_2=R_3-R_2$;
a third annular region extending from the radius $R_3$ to an outermost glass radius $R_4$;
wherein the core comprises a maximum relative refractive index, $\Delta_{0MAX}$, the first annular region comprises a minimum relative refractive index, $\Delta_{1MIN}$, and the second annular region comprises a minimum relative refractive index, $\Delta_{2MIN}$, wherein $\Delta_{0MAX}>0>\Delta_{1MIN}>\Delta_{2MIN}$; and
wherein the core and the cladding provide a fiber with cable cutoff less than 1500 nm, an attenuation at 1550 nm of less than 0.20 dB/km, and an effective area at 1550 nm of greater than 130 µm$^2$; and
wherein the second annular region comprises silica based glass with at least 50 closed randomly dispersed voids situated therein, and (i) the mean distance between the voids is less than 5000 nm, and (ii) at least 80% of the voids have a maximum cross-sectional dimension Di of less than 1000 nm.

12. The optical fiber of claim 11, wherein $0.3\%>\Delta_{0MAX}>0.1\%$, $-0.1\%>\Delta_{1MIN}>-0.5\%$, and $\Delta_{2MIN}<-0.7\%$.

13. The optical fiber of claim 11, wherein 6 μm<$R_1$<9 μm, 16 μm<$R_2$<24 μm, and 20 μm<$R_3$<30 μm.

14. The optical fiber of claim 11, wherein 3 μm<$W_1$<15 μm and 1.5 μm<$W_2$<4.5 μm.

15. The optical fiber of claim 11, wherein the first annular region comprises fluorine and is void-free.

16. The optical fiber of claim 11, wherein the first annular region comprises a profile volume $V_1$, equal to:

$$2\int_{R_1}^{R_2} \Delta(r) r\, dr;$$

wherein $|V_1|$ is at least 30%-μm².

17. The optical fiber of claim 11, wherein the core and the cladding provide a fiber having an attenuation at 1550 nm of less than 0.19 dB/km.

18. The optical fiber of claim 11, wherein the core and the cladding provide a fiber with an effective area at 1550 nm of greater than 150 μm².

19. The optical fiber of claim 11, wherein the core and the cladding provide a fiber with a bend loss at 1550 nm of less than 1.0 dB/turn on a 20 mm diameter mandrel.

\* \* \* \* \*